United States Patent [19]

Skupen et al.

[11] Patent Number: 4,835,480
[45] Date of Patent: May 30, 1989

[54] ELECTRONIC SIGNAL SYNCHRONIZATION APPARATUS FOR RADAR AND THE LIKE

[75] Inventors: William L. Skupen, Anaheim; Erno H. Ross, Fullerton, both of Calif.

[73] Assignee: Hughes Aircraft Company, Los Angeles, Calif.

[21] Appl. No.: 897,161

[22] Filed: Aug. 15, 1986

[51] Int. Cl.$^4$ .................... H03K 17/26; H03K 21/00; H04B 1/44

[52] U.S. Cl. ...................... 328/75; 342/135; 342/195; 377/33; 377/44; 377/39; 455/78

[58] Field of Search ............... 375/113, 116; 342/175, 342/195, 135; 455/84, 78, 79; 328/75; 377/2, 33, 39, 44

[56] References Cited

U.S. PATENT DOCUMENTS

| | | | |
|---|---|---|---|
| 2,862,114 | 11/1958 | Solomon | 328/75 X |
| 4,079,379 | 3/1978 | Piesinger | 375/106 |
| 4,099,137 | 7/1978 | Alm, Jr. et al. | |
| 4,117,661 | 10/1978 | Bryant, Jr. | 375/106 |
| 4,398,195 | 8/1983 | Dano | |
| 4,417,248 | 11/1983 | Mathews | |
| 4,589,100 | 5/1986 | Savit | |
| 4,642,647 | 2/1987 | Sturza et al. | 342/415 |

FOREIGN PATENT DOCUMENTS 2394927 2/1979 France ................. 328/75

Primary Examiner—Stephen C. Buczinski
Assistant Examiner—Linda J. Wallace
Attorney, Agent, or Firm—A. W. Karambelas

[57] ABSTRACT

An electronic signal synchronization apparatus useful with radars and other electronic systems requiring synchronizing signals provides, for a range of N pulses, M sets of synchronizing signals which occur at M different range event pulse counts. The signal synchronization apparatus comprises a microprocessor and a synchronizer, the latter including a range pulse counter, a range memory, an event counter and an event memory. The range memory, preferably a RAM, is connected for outputting an event count enabling signal each time the range counter reaches an event pulse count. The event counter increments one count each time a count enabling signal is received from the range memory. At each event count, the event memory outputs the corresponding set of synchronizing signals. At the Nth range pulse count, the event memory provides an $\overline{\text{END OF RANGE}}$ signal which resets the range and event counters to thereby enable the counters to repeat the counting as many times as is necessary. The microprocessor provides the capability for programming both the events and the timing of the events. Provisions are included whereby the microprocessor controls the synchronizer in LOAD, OPERATE and ERASE & STOP modes of operation.

21 Claims, 4 Drawing Sheets

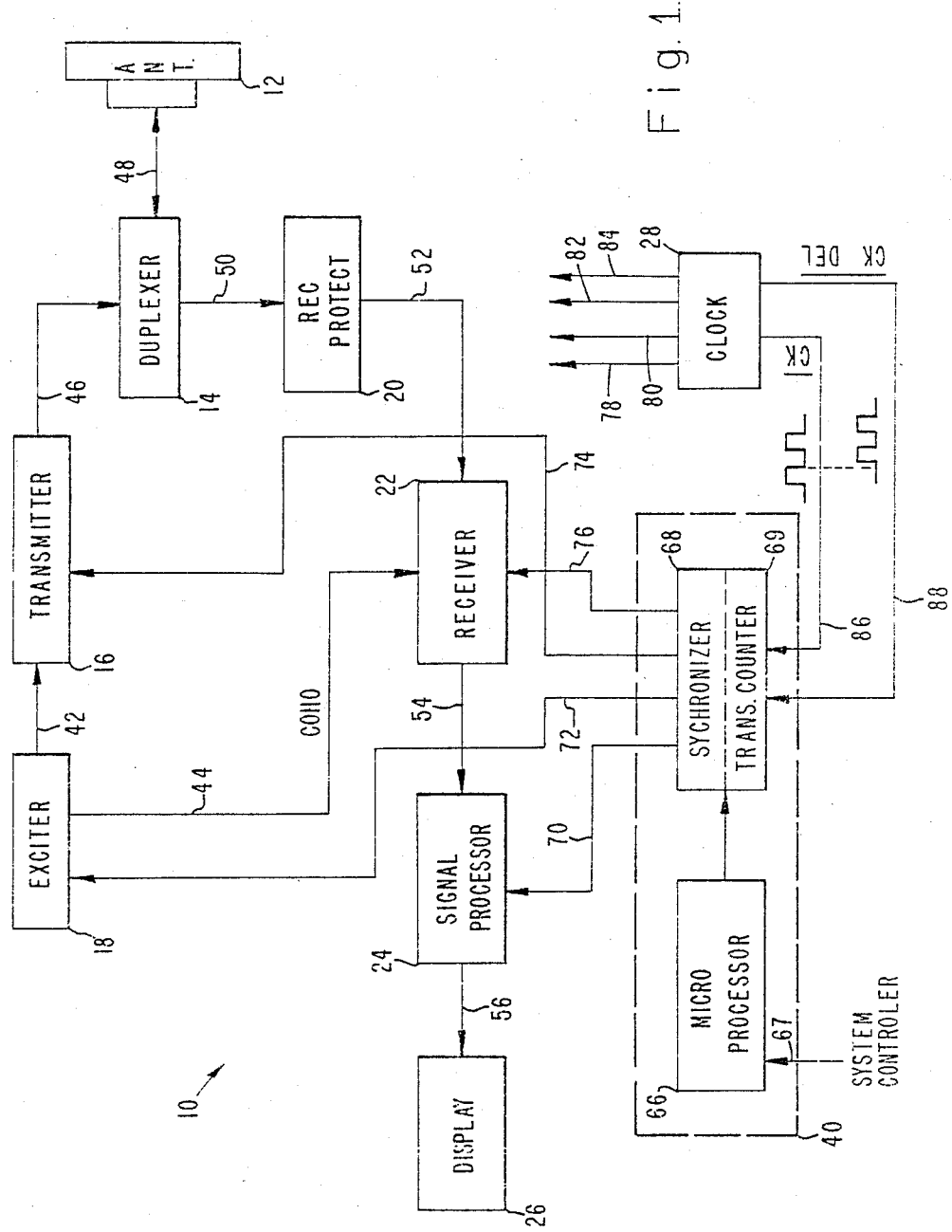

ELECTRONIC SIGNAL SYNCHRONIZATION APPARATUS FOR RADAR AND THE LIKE

BACKGROUND OF THE INVENTION

1. Field of the Invention

The present invention relates generally to the field of radar apparatus and, more particularly, to electric signal synchronization apparatus or circuits used in radar and other electronic equipment, the operation of which is controlled by electronic synchronization signals.

2. Discussion of Related Art

Radars, like many other electronic systems have dramatically increased in performance, complexity and cost over the past several decades. The driving forces for radar improvement have included greatly expanded air traffic since the end of World War II and the new and increasingly sophisticated military weapon systems for and against which modern radars are required to operate. At the same time, the substantial radar improvements have been made possible by technical advancements in such fields as computers, microelectronics and materials.

Along with important improvements in radar performance, an increased need has arisen for improved radar reliability and rather cost control, the latter becoming especially important as military budgets receive closer governmental and public scrutiny. The costs of radar systems, as for other electronic systems, reflect not only procurement costs for the systems but also the cost of spare parts and maintenance and repair costs.

Radar systems, to which the present invention is principally but not exclusively directed, are known to be comprised of several different subsystems and components. Principal of these subsystems and components are the transmitting and receiving antenna, usually integrated into a single antenna or antenna assembly; a microwave transmitter; a transmitter exciter; a return signal receiver; a duplexer; a receiver protector; a return signal processor and a synchronizer. Various of these radar subsystems and components may, of course, be physically integrated so as to be packaged in a common housing or housings. Nevertheless, the general functions can still be considered as being separate.

It can be readily appreciated that, during normal radar operation, different subsystems are required to perform different functions at different operating intervals (that is, clocks). Generally, these functions vary with time, but may usually be repetitive over longer periods of time. As an example, an antenna may, during rotation, change its angular pointing direction; however, the same rotational positions are repeated each time the antenna is rotated through 360°. Therefore, in some radar systems the antenna sweep period may establish the repetitive functions of some components. Also, some or all of the functions may change as the operating mode is changed, for example, in some radar systems, between search and track modes.

In a typical radar system, each repetitive operating cycle is divided into a large number, such as 64,000, of very short time intervals which are commonly referred to as pulses or counts. At specific counts in each cycle, specific events are required to occur which collectively define or control operation of the radar system. Accordingly, the operation of the radar system can be defined by a schedule of events which are required to occur at specific pulses or counts, it being recognized that at many pulses no events may be required while at other pulses the associated event may involve several different operations.

Assuming that a radar system operation can, in fact, be defined by an event-pulse schedule, it is the principal function of the synchronizer to provide controlling or implementing signals to the proper system components at the proper pulse counts. As a result, the synchronizers are required to have the capability for handling the entire number of pulses per cycle (range) and to provide for numerous, often simultaneous, outputs of control or implementing signals (events).

The usual manner of implementing a typical synchronizer has heretofore been to provide a memory having a number of memory locations equal to the number of pulses in a range for each funcitonal output. Typically, this has involved the use of large numbers of random access memories (RAMs) with a large number of output addresses. For a 16,000 (16K) count system having 16 outputs, about 20 conventional integrated circuits have, for example, been required. For 64K count system having 16 outputs, the integrated circuit count typically increases to 68. Accommodating such numbers of integrated circuits requires a number of printed circuit boards (PCBs).

The use of such large numbers of integrated circuits to implement syncrhonizers increases system parts and assembly costs and also increases the size and weight of electronic portions of the radar system, an important consideration for airborne and many mobile radar systems. Moreover, the large number of circuits and PCBs required increases the logistical costs associated with providing and stocking adequate replacements parts. Still further, as is commonly known, reliability tends to decrease as the parts count increases, due to the general statistical nature of malfunctions or failures.

Also, it can be appreciated that even more complex radars, in current prototype, design or conception stages, are expected to increase the performance requirements of synchronizers, thereby tending to further increase the size, weight and cost of the synchronization and reduce their maintainability and reliability. Therefore, to offset such new requirements for more complex synchronizers for new generation radars, as well as to reduce costs, size and weight of present generation radars, improvements to synchronizers are needed to reduce the parts count and provide more efficient operation.

SUMMARY OF THE INVENTION

Electronic signal synchronization apparatus, according to the present invention, efficiently provides synchronization signals in accordance with a preestablished signal schedule which requires, for a range having a large number, N, of pulses, a small number, M, of electronic synchronization signals to be provided, for example, to a radar system or other electronic system which is operationally dependent upon being provided synchronization signals at M different, predetermined pulses for each range. The providing of a required set of synchronization signals at a particular pulse may be defined as an "event" and the pulses at which events are schedules may be defined as "event pulses" or "event counts."

More specifically comprising the signal synchronizing apparatus of the present invention are means for providing range pulses (counts); range counting means for receiving and for counting, from 1 through N for each range, the pulses as they occur; and range memory means connected to the range counting means for receiving the pulse count therefrom and, in response to an event pulse being reached, for providing an event count enabling signal. The signal synchronization apparatus also includes event counting means connected to the range memory means for receiving the event count enabling signals therefrom and for counting in sequence, from 1 through M, the events in the range. Event memory means are connected for receiving the event counts from the event counting means and, in response thereto, for providing a corresponding one of the synchronization signals at each established event pulse.

According to a preferred embodiment, the range memory means have a number of pulse memory locations equal to the number N of range counts. Codes for causing the event enabling signals are stored in those M pulse count memory locations which correspond to the M pulse counts at which an event is scheduled to occur. Also, in such embodiment, the event memory means have a number of event memory locations equal to the number M of events, each of the event memory means have a number of event memory locations equal to the number M of events, each of the event memory locations corresponding to one of the predetermined event pulses. Codes for causing a corresponding one of the required synchronization signals are stored in each of the M event memory locations.

Control means are included in the synchronization apparatus for causing the event count enabling signal code to be stored in the M event pulse memory locations of the range memory means and for causing the synchronization signal codes to be stored in the M event memory locations of the event memory means, both in accordance with the signal schedule.

It is preferred that the control means comprise a microprocessor which is programmed to contain the signal schedule. Also preferably, the range memory means and the event memory means each comprise a random access memory (RAM). In an embodiment of the invention, the means for providing the range pulses comprises a flip-flop circuit.

Means are preferably included in the signal synchronization apparatus for resetting the range counting means and the event counting means to zero counts when the Nth count of pulses is reached. Such resetting means comprises means associated with the event memory means for providing an end-of-range signal to both the range and the event counting means.

An efficient signal synchronization apparatus is thereby provided.

BRIEF DESCRIPTION OF THE DRAWINGS

The present invention can be more readily understood by a consideration of the accompanying drawings in which:

FIG. 1 is a functional block diagram of an exemplary radar system in which a signal synchronization apparatus of the present invention may be used to advantage;

DESCRIPTION OF THE PREFERRED EMBODIMENT

Figure 2A:
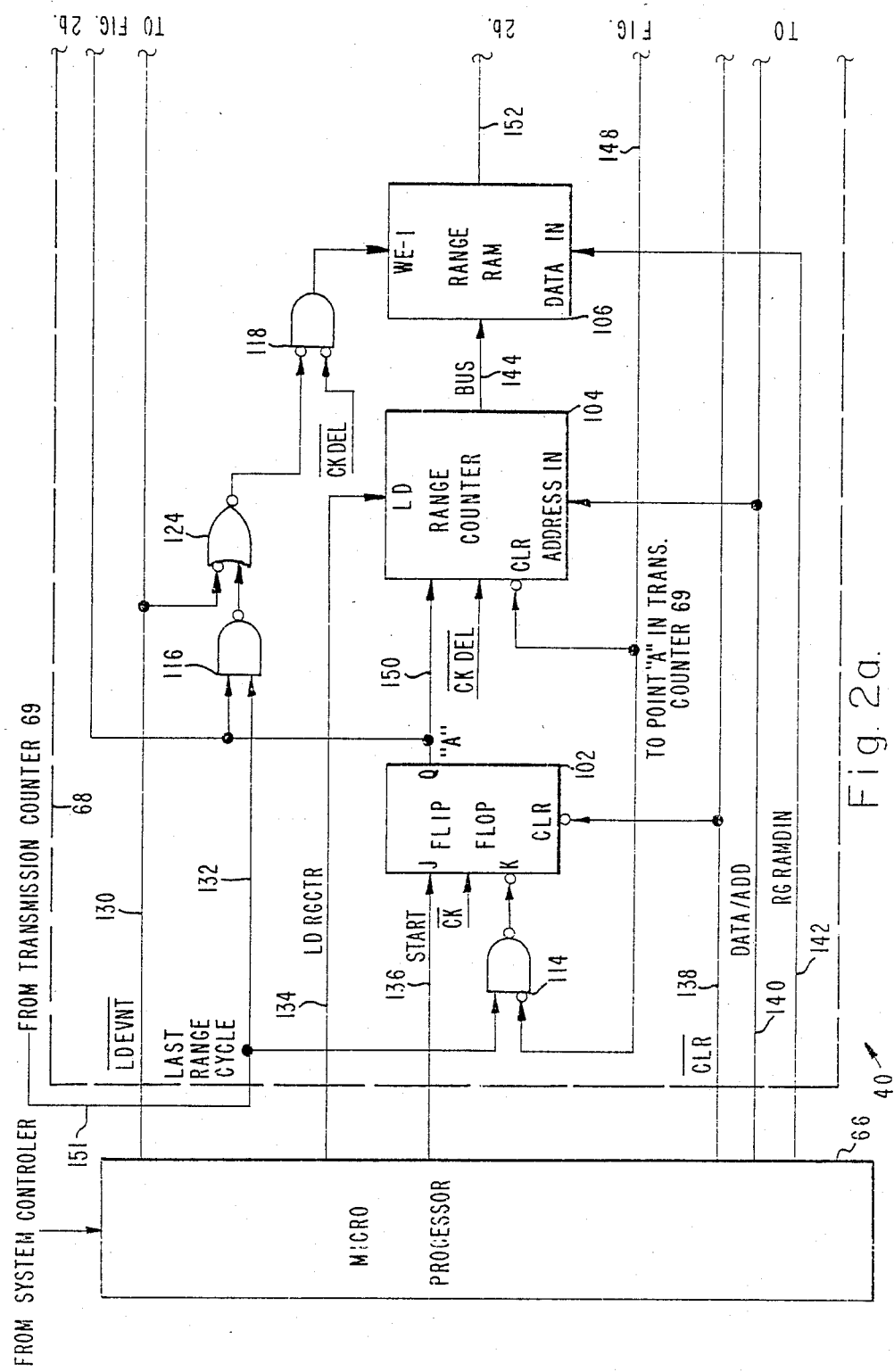
FIG. 2 is a functional block diagram of the signal synchronization apparatus of FIG. 1 showing the general configuration thereof, FIG. 2a showing part of the block diagram and FIG. 2b showing the rest of the diagrams.

For purposes of illustrating the manner in which the present signal synchronization apparatus can be used to advantage and for enabling a better understanding of the invention, there is shown, in functional block diagram form in FIG. 1, an exemplary radar system 10. Shown comprising radar system 10 are a transmitting-/receiving antenna 12, a duplexer 14, a transmitter 16, an exciter 18, a receiver protector 20, a return signal receiver 22, a return signal processor 24, a display 26 and a system timing clock 28. Additionally comprising radar system 10 is a signal synchronization apparatus 40 according to the present invention and more particularly described below.

As depicted in FIG. 1, exciter 18 provides oscillator signals, over an electrical line 42, to transmitter 16 and a coherent oscillator signal (COHO) to receiver 22, over a line 44. In response to signals from exciter 18, transmitter 16 provides a radar signal to duplexer 14, over a line 46. From duplexer 14, the signal to be transmitted is fed to antenna 12 over a line 48. Radar return signals received by antenna 12 are fed back to duplexer 14 over line 48 and from the duplexer to receiver protector 20 over a line 50. From receiver protector 20, the radar return signals are provided, over a line 52, to receiver 22 and from the receiver, over a line 54, to signal processor 24. Within signal processor 24, the radar return signal is processed and information suitable for display is provided, over a line 56, to display 26.

The function of signal synchronization apparatus 40, which comprises a microprocessor 66 which maybe provided control signals, over a conduit 67, from a system controller (not shown) and an electronic signal synchronizer 68 and a transmission counter 69 (discussed below), is to provide specific control or operation implementation signals, over respective lines 70, 72, 74 and 76 to signap processor 24, to exciter 18, to transmitter 16 and to receiver 22, such lines being connected to an output of signal synchronizer 68. Clock 28 provide timing (clock) signals throughout radar system 10, for example, over lines 78, 80, 82 and 84, with inverted clock ($\overline{CK}$) and inverted clock delay ($\overline{CKDEL}$) signals being provided to signal synchronization apparatus 40, over lines 86 and 88, respectively.

As can be appreciated, radar system 10 is depicted in FIG. 1 in simplified form for illustrative purposes. Actual radar systems are generally more complex than shown and it may be expected that signal synchronization apparatus 40 would have many more outputs than the four shown, no limitation to any specific number of signal outputs being either intended or implied by showing only four output lines 78, 80, 82 and 84. It is also to be understood that although, for illustrative purposes, FIG. 1 shows signal synchronization apparatus 40 as forming part of radar system 10, the apparatus may alternatively be used with similar or other types of electrical or electronic systems in which a number of different control signals are required at specific timing intervals to enable system operation.

In a general sense, it can be considered that the function of signal synchronization apparatus 40 is to provide a series of synchronization signals (or sets of signals) in accordance with a preestablished or programmable signal schedule which requires, for a range having large number, N, of pulses, that a smaller number M of predetermined electronic synchronization signals be provided at M different range counts or pulses which are determined by microprocessor 66 in accordance with specific system requirement. Insofar as general configuration and operation of synchronizer apparatus 40 is concerned, it is immaterial what the synchronization signals are to be used of or of the nature of the electronic system with which the signal synchronization apparatus is used.

Figure 2B:
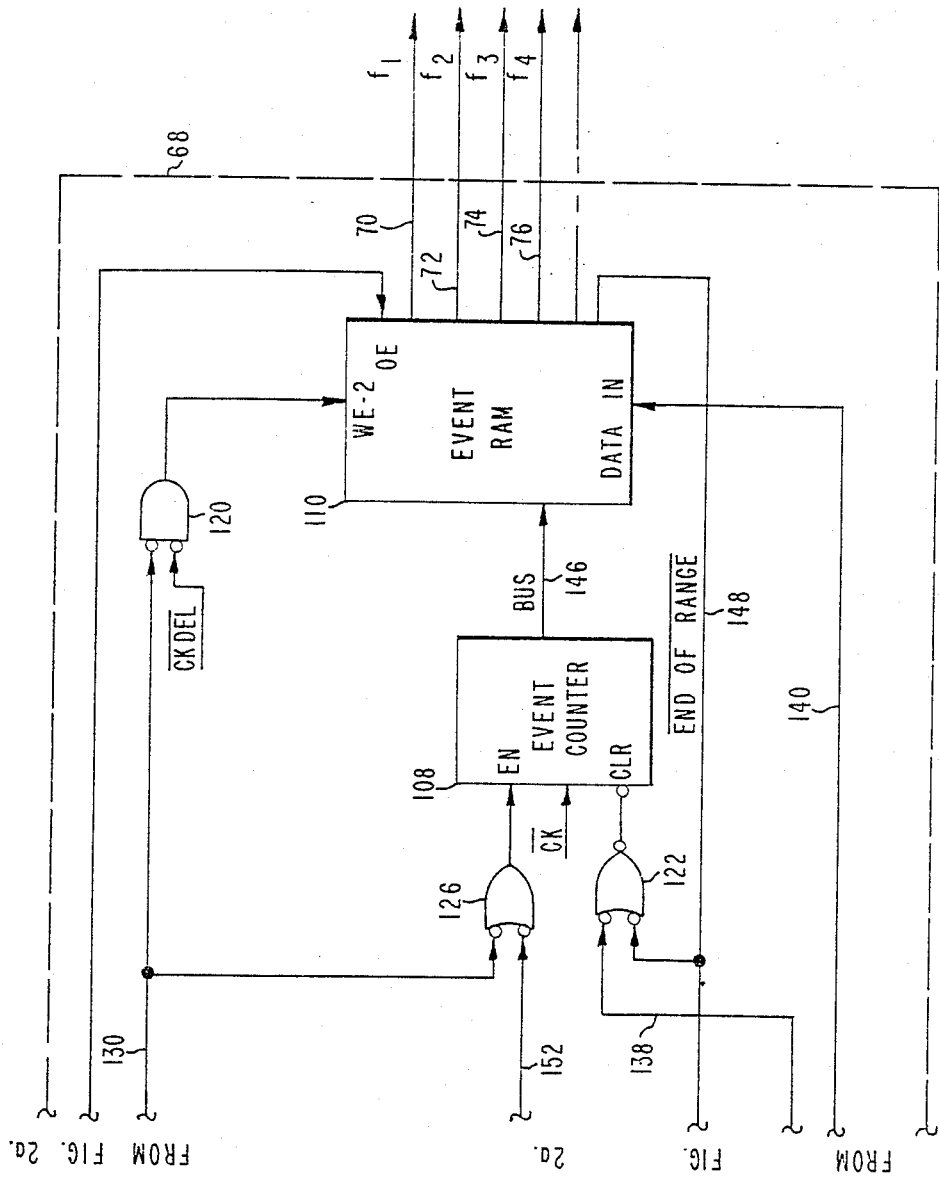

Principally comprising synchronizer 68, as shown in functional block form in FIG. 2, are a pulse-providing flip-flop circuit 102, a range counter 104, a range memory or RAM 106, (FIG. 2a), an event counter 108 and an event memory or RAM 110, (FIG. 2b). As more particularly described below, synchronization signals are provided (in binary format) by event memory 110, a simplified, representative signal output being depicted for illustrative purposes in FIG. 3. By way of specific example, with no limitations being thereby intended or implied, range and event counters 106 and 108 may comprise commercially availabe type 54LS163 counters; range memory RAM 100 may comprise a 64K by 1 bit RAM and event memory RAM 110 may comprise a 256 by 8 bit RAM, both types of such RAMs being commercially available from numerous manfacturers.

Further comprising synchronizer 68 are a NAND gate 114; first, second and third AND gates 116, 118 (FIG. 2a) and 120 (FIG. 2b), respectively; a NOR gate 122 (FIG. 2b) and first and second OR gates 124 (FIG. 2a) and 126 (FIG. 2b), respectively. Gates 114-126 are connected in synchronizer 68 as shown in FIGS. 2a and 2b. Transmission counter 69 is configured substantially the same as synchronizer 68 and will not, therefore, be further described.

Synchronizer 68 is programmed (that is, loaded) and controlled by microprocessor 66; in turn, the microprocessor is software programmed or controlled by the above-mentioned system controller in a conventional manner so as to contain, for example, the signal schedule and with instructions for operating the synchronizer. A variety of different programs and signal schedules, none of which form part of the present invention, may be used in conjunction with microprocessor 68 to adapt signal synchronization apparatus 40 for use in different electronic systems. All inputs are clocked, by $\overline{CK}$, from microprocessor 66, into synchronizer 68, a delayed clock $\overline{CKDEL}$ being used internally of the synchronizer for purposes which will become apparent from the following description.

Inputs into synchronzier 68 are: $\overline{LDEVNT}$ (load event) on a line 130, LAST RANGE CYCLE on a line 132, LDRGCTR (load range counter) on a line 134, START on a line 136, $\overline{CLR}$ (clear) on a line 138, DATA/ADDRESSES on a bus 140 and RGRAMDIN (range RAM data in) on a line 142 (FIG. 2a). All such inputs are from microprocessor 66 except the LAST RANGE CYCLE input on line 132 which is received from transmission counter 69 in the configuration shown. In some other configurations the LAST RANGE CYCLE input may be from microprocessor 66 or from elsewhere in the system.

Synchronization apparatus 40 has, as more particularly described below, LOAD, OPERATE and ERASE & STOP modes of operation. During the LOAD operation, data and addresses concerning range and events, event pulses and synchronization signals are programmed into synchronizer 68 by microprocessor 66. It is emphasized that the term "range" as used herein refers to a range or set of counts or pulses and may generally, therefore, not be related to any distance range, such as an operating range of radar system. As an example, the range involved may comprise a set of 64,000 pulses or counts as the pulses may sometimes be referred to.

The LOAD operation is typically initiated by turning on the associated system, such as radar system 10, or when operating modes of the associated system are switched. When different system operating modes are available, microprocessor 66 may be programmed with synchronization signal schedules and related data for each system operating mode.

During the synchronizer OPERATE mode, synchronizer 68 counts the range pulses and provides the programmed sets of synchronization signals at the programmed event pulses. At the end of each range count (count equal to N), synchronizer 68 is automatically reset and starts counting the next range, the cycle being repeated until the associated system is shut down or the system operating mode is switched.

At the end of the last cycle of the OPERATE mode, microprocessor 66 initiates the ERASE & STOP mode in which synchronizer 68 is cleared and stopped.

A more detailed description of the synchronizer LOAD, OPERATE and ERASE & STOP modes will enable a better understanding of the construction of synchronization apparatus 40 and of synchronizer 68 in particular.

Referring to FIGS. 2a and 2b, the LOAD operation is initiated by microprocessor 66 sending a clear ($\overline{CLR}$) signal, over line 138, to clear flip-flop 102 and also to clear (through NOR gate 122) event counter 108. Following the $\overline{CLR}$ signal, microprocessor 66 provides, on alternating clocks ($\overline{CK}$), range loading signals (LDRGCTR) to range counter 104, over line 134, and event loading signals ($\overline{LDEVNT}$), over line 130, to event RAM 110 (clocked by $\overline{CKDEL}$ through AND gate 120) and to event counter 108 (through OR gate 126).

At the same time that the first LDRGCTR signal is provided on line 134, microprocessor 66 provides, on bus 140, an initial range count "address," which is latched into range counter 104 by $\overline{CKDEL}$, such range count address simultaneously appearing on a RANGE ADDRESS BUS 144 which connects an input of range RAM 106 to the output of range counter 104.

At the next clock, along with providing the first $\overline{LDEVNT}$ signal on line 130, microprocessor 66 provides, on bus 140, a first set of timing decode signals which are associated with the first range count address. This first set of timing decode signals is entered (at an initial event count address) into event RAM 110 by $\overline{CKDEL}$ (through AND gate 120). Simultaneously with the providing of the first timing decode signals on bus 140, microprocessor 66 provides a high (one) RGRAMDIN signal, on line 142, which is entered into range RAM 106 by $\overline{CKDEL}$ (through AND gate 118) at the first range count address.

At the next clock, $\overline{CKI}$, microprocessor 66 provides, along with providing a LDRGCTR signal to range RAM 106 on line 134, a new range count "address" (event pulse address) on bus 140. This new event pulse address is entered into range counter 104 by CKDEL and is provided, at the same time, over RANGE ADDRESS BUS 144, to range RAM 106. This new event pulse range is a "real" address at which the next timing decode (event) occurs and may, as a consequence, entail a large increment of range pulses from the initailly entered event pulse.

Along with providing the next $\overline{\text{LDVENT}}$ signal on line 130, microprocessor 66 provides, on the next $\overline{\text{CK}}$ clock, a new set of timing decode (event) signals over bus 140 to event RAM 110. This new timing decode signal set is written into event RAM 110 at an event count address (memory location) which corresponds to event count 1, such event count having been incremented by the previous $\overline{\text{LDVENT}}$ signal (through OR gate 126). Event count 1, which is normally event address 1, is provided on an EVENT ADDRESS BUS 146 which connects event RAM 110 to the output of event counter 108 (FIG. 2b). Thus, whenever event counter 108 is indexed one event count, the new event count number is provided on BUS 146 to event RAM 110 and provides the address at which the corresponding timing decode signals are stored.

Simultaneously with providing the new $\overline{\text{LDVENT}}$ signal on line 130, microprocessor 66 provides, on normally high RGRAMDIN line 142, a zero signal which is entered into range RAM 106 (by $\overline{\text{CKDEL}}$ through AND gate 118) at the first event pulse address (memory location) as provided over BUS 144. This zero signal will, in the OPERATE mode, be the signal that causes event counter 108 to increment one event count (as described below).

The described operation of alternatively loading range count addresses into range counter 1 (and into range RAM 106 over BUS 144), timing decode signals into event RAM 110 and event counter incrementing signals into range RAM 106 automatically continues until all addresses and signals, including a last range count, $\overline{\text{END OF RANGE}}$ synchronization signal, are loaded into synchronization 68. At that point, range counter 104 is reset to pulse count zero and microprocessor 66 provides a $\overline{\text{CLK}}$ signal, on line 138, to reset (through NOR gate 122) event counter 108 to zero. Thereafter, and $\overline{\text{END OF RANGE}}$ output line from event RAM 110 remains high.

Figure 3:
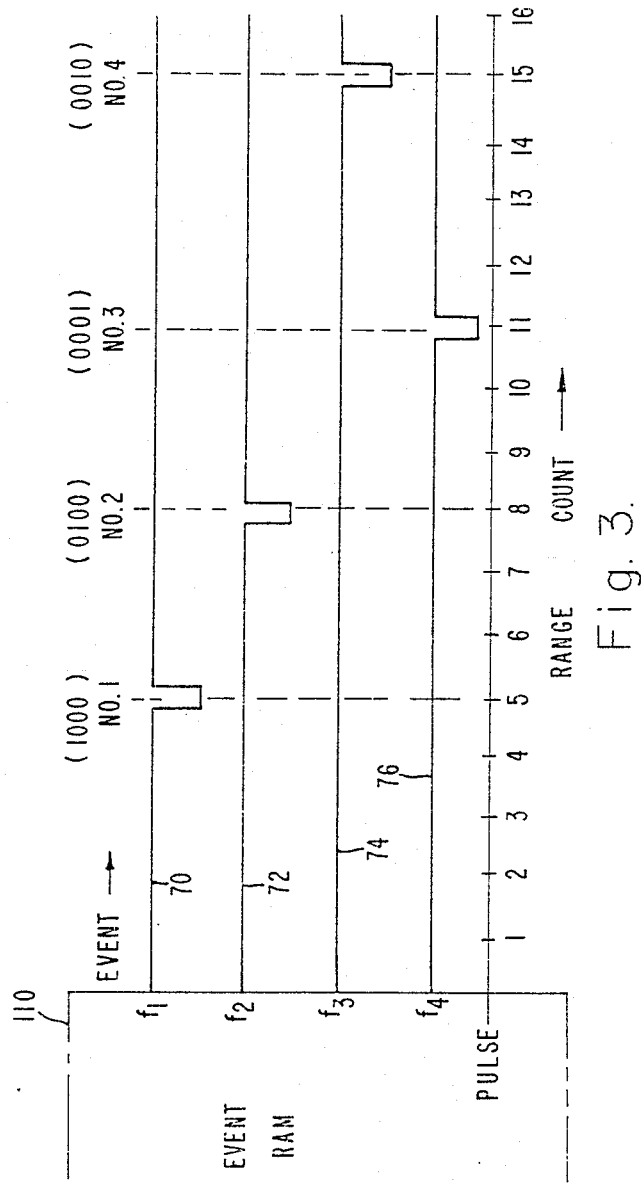
FIG. 3 is a simplified, representative timing diagram showing typical output signals of the signal synchronization apparatus depicted in FIG. 2.

By way of a greatly simplified, illustrative example, let it be assumed that the involved signal schedule includes the timing decode events shown below in Table 1 and as also depicted in FIG. 3.

TABLE 1

| Range Count (Event Pulse) | Event Count | Timing Decode Signal |
|---|---|---|
| 5 | 1 | (1000) |
| 8 | 2 | (0100) |
| 11 | 3 | (0001) |
| 15 | 4 | (0010) |

When the synchronizer LOAD operation is completed, there will have been stored in range RAM memory locations 5, 8, 11 and 15 an event count enabling signal or code. For example, if the event count enabling signal or code is a binary "one," all pulse count locations other than 5, 8, 11 and 15 will store a binary "zero." Conversely, if the enabling signal or code is a binary "zero," all these other range RAM memory locations will store a binary "one." Also, when the LOAD operation is completed, there will be stored in event RAM event memory location 1 (corresponding to pulse count 5) a binary (1000) or a code corresponding respectively thereto. In event memory locations 2, 3 and 4 (corresponding to event pulses 8, 11 and 15), there will be stored, respectively, (0100), (0001) and (0010) or codes corresponding thereto. Range counter 104 and event counter 108 will be reset to zero counts at the end of the LOAD cycle.

Microprocessor 66 initiates the synchronizer OPERATE mode by providing a START signal on line 136 to flip-flop 102, such signal being latched into the flip-flop by $\overline{\text{CK}}$. Receiving of the START signal by flip-flop 102 starts the generating of range pulses to be counted by range counter 104; the output of the flip-flop being provided to the range counter over a line 150 (FIG. 2a). When the range count in range counter 104 reached the first event count (for example, range count 5 as shown in Table 1), range RAM 106 provides to event counter 108, over a line 152 (and through OR gate 126), an event count enabling signal. This enabling signal (which causes line 152 to go low for one count) to event counter 108 causes the event count to increment from zero to 1. In response to the event count 1 on BUS 146, (FIG. 2a), event RAM 110 outputs on lines 70, 72, 74 and 76 the contents of the first event memory location, for example, a (1000) as shown in Table 1 and depicted in FIG. 3.

Subsequently, each time range counter 104 reaches an event pulse (for example, at subsequent counts 8, 11 and 15, Table 1), event counter 108 is incremented one count and event RAM outputs, on lines 70–76 a corresponding set of timing decode signals, for example, in sequence: (0100), (0001) and (0010), (Table 1 and FIG. 3). When all of the range pulses have been counted by range counter 104, event RAM outputs an $\overline{\text{END OF RANGE}}$ a signal on line 148 which resets both range counter 104 and event counter 108 to their respective zero counts and the counting starts over again. The $\overline{\text{END OF RANGE}}$ signal on line 148 is also provided over a line 149 to a point in transmission counter corresponding to point "A" (line 150) of transmission counter. The $\overline{\text{END OF RANGE}}$ signal may be stored in event RAM in an (M+1)th memory location associated with the Nth range count. In such a configuration, when the Nth range pulse is counted, an enabling signal stored in the Nth pulse memory location in range RAM 106 enables an (M+1)th event count by event counter 108 which, in turn, causes event RAM 110 to output the $\overline{\text{END OF RANGE}}$ signal.

When the OPERATE mode is completed, a LAST RANGE CYCLE signal is provided by the last cycle decode from transmission counter 69 (over a line 151) or elsewhere depending upon system requirements or application on line 132 (to AND gate 116). This signal actuates (through OR gate 124 and AND gate 118) WE 1 of range RAM 106. Since RGRAMDIN on line 142 is high unless brought low by microprocessor 66, upon actuation of WE 1 or range RAM 106, all N pulse memory locations of the range RAM are written "high" in the last range cycle. This occurs immediately after event counter 108 is incremented into its last event count (by a count enabling signal on line 152). Such "double action" is made possible by the offset in clocks (that is, the time delay between $\overline{\text{CK}}$ and $\overline{\text{CKDEL}}$) applied to event counter 108 and range RAM 106. Consequently, range RAM 106 is erased during the last range cycle and the erasing does not require an additional interval. As above described, at the last (M+1)th event count, event RAM outputs an $\overline{\text{END OF RANGE}}$ signal on line 148, thereby resetting flip-flop 102, range counter 104 and event counter 108. Signal synchronization apparatus 40 is, at this point, ready to be reloaded.

Transmission counter 69 receives the same inputs from microprocessor 66 as does synchronizer 68 and counts the number of transmissions. At the end of a predetermined number of transmissions, transmission counter outputs the equivalent EVENT RAM the LAST RANGE CYCLE signal.

It is apparent from the foregoing description of synchronization apparatus 40 that although range RAM 106 requires N memory locations (for example, 64,000 for N equal to 64K), it requires only a single output. Also, it is apparent that event RAM is required to have only a relatively few (M or M+1) memory locations equal to the number M of events required plus, preferably, an additional (M+1)th memory location for the END OF RANGE signal, and may have as many output lines as required to control the various functions of the associated radar or item being synchronized. As a result, range RAM 106 and event RAM 110 can both be relatively small and relatively inexpensive. Therefore, by the described configuration of signal snychronization apparatus 40, the apparatus is very efficient in operation and requires only a minimum number of electronic parts; the cost, size and weight being accordingly minimized.

Although there has been described above a particular embodiment of a signal synchronization apparatus in accordance with the present invention, for purposes of describing the manner in which the invention may be used to advantage, it is to be understood that the invention is not limited thereto. Accordingly, any and all modifications or variations which may occur to those skilled in the art are to be considered to be within the scope and spirit of the claims as appended hereto.

What is claimed is:

1. Electronic signal synchronization apparatus for providing synchronizing signals according to a synchronization signal schedule having a range comprised of a large number of range pulses N, a smaller number of electronic synchronization signals M provided at predetermined programmable ones of said range pulses the providing of the synchronizing signals being defined as an "event" and the specific range pulses at which the synchronizing signals are to be provided being defined as "event pulses," the signal synchronization apparatus comprising:
   (a) means for providing range pulses;
   (b) range counting means for receiving said range pulses and for counting the number of said pulses;
   (c) range memory means connected to the range counting means to receive the range pulse count therefrom for providing an event count enabling signal in response to each of said event pulses;
   (d) event counting means connected to the range memory means for receiving the event count enabling signals therefrom and for counting, in sequence from 1 through M, the number of events in said range; and
   (e) event memory means connected to the event counting means for receiving the event count therefrom and, responsive thereto, for providing at each event count corresponding ones of the predetermined synchronization signals.

2. The signal synchronization apparatus as claimed in claim 1 wherein the range memory means have a number of pulse count memory locations equal to the number N; codes for causing the event count enabling signal are stored in M memory locations corresponding to the M predetermined event pulse counts at which an event is to occur.

3. The signal synchronization apparatus as calimed in claim 1 wherein there are M event memory locations, each of which corresponds to one of the event pulses, codes for causing a corresponding one of the event pulses being stored in each of the M event memory locations.

4. The signal synchronization apparatus as claimed in claim 3 including computer means for causing the event enabling signal codes to be stored in the M event pulse memory locations being provided by said computer means.

5. The signal synchronization apparatus as claimed in claim 4 wherein the computer means causes the synchronizing signal codes to be stored in the M event memory locations in accordance with said synchronization signal schedule.

6. The signal synchronization apparatus as claimed in claim 5 wherein the computer means includes a microprocessor which provides the signal schedule.

7. The signal synchronization apparatus as claimed in claim 1 including means for resetting to zero the range counting means and the event counting means when the Nth range pulse count has been reached by the range counting means.

8. The signal synchronization apparatus as claimed in claim 7 wherein the resetting means include means associated with the event memory means for providing an end-of-range signal to the range counting means and to the event counting means.

9. The signal synchronization apparatus as claimed in claim 1 wherein the range memory means and the event memory means each include a random access memory (RAM) circuit.

10. Electronic signal synchronization apparatus for providing synchronizing signals according to a synchronization signal schedule which requires, for a range having a large number, N, of range pulses, a smaller number of electronic synchronization signals to be provided at M different, range pulses, the providing of synchronizing signals being defined as an "event" and the specific range pulses at which the synchronizing signals are to be provided being defined as "event pulses," the signal synchronization apparatus comprising:
   (a) means for providing range pulses;
   (b) range counting means for receiving said range pulses and for counting in sequence, from 1 through N, the number of pulses of each range;
   (c) range memory means connected for receiving the pulse counts from the range counting means, for storing in each of scheduled different pulse count memory locations corresponding to the M scheduled event pulses an event count enabling signal code and for providing an event count enabling signal whenever the pulse count of the range counting means reaches one of the M event pulses;
   (d) event counting means connected for receiving the event count enabling signals from the range memory means and for counting in sequence, from 1 through M, said event count enabling signals; and
   (e) event memory means connected for receiving the event counts from the event counting means, for storing in M different event memory locations corresponding synchronizing signal codes and for providing said synchronizing signals when each of the M event pulse counts is reached by the range counting means.

11. The signal synchronization apparatus as claimed in claim 10 wherein the range memory means has a number of pulse count memory locations equal to the number N of pulses in a range.

12. The signal synchronization apparatus as claimed in claim 11 including computing means for storing said signal schedule and for providing to the range memory means the M pluse count memory locations to be used to store the event count enabling signal codes.

13. The signal synchronization apparatus as claimed in claim 12 wherein the computing means provides to the event memory means the synchroniztion signal required at each one of the M predetermined event counts.

14. The signal synchronization apparatus as claimed in claim 10 wherein the event memory means provides an end-of-range signal when the N pulse count is reached.

15. The signal synchronization apparatus as claimed in claim 14 wherein the range counting means and the event counting means are each configured for being reset to a zero count in response to said end-of-range signal provided by the event memory means.

16. The signal synchronization apparatus as claimed in claim 10 including means for causing the range counting means and the event counting means to reset and start recounting when the range pulse count reaches the number N.

17. The signal synchronization apparatus as claimed in claim 10 wherein the synchronization signal codes are the synchronization signals.

18. The signal synchronization apparatus as claimed in claim 10 including means for providing an "end-of-cycle" signal to stop the operation thereof.

19. Electronic signal synchronization apparatus for providing synchronizing signals according to a synchronization signal schedule having a range comprised of a large number of range pulses N, a smaller number of synchronization signals M predetermined programmable onew of said range pulses, the providing of synchronizing signals being defined as an "event" and the specific range pulses at which the synchronizing signals are to be provided being defined as "event pulses," the signal synchronization apparatus comprising:

(a) means for providing range pulses;

(b) range counting means connected to the range pulse providing means for receiving the pulses therefrom and for counting, in sequence from 1 through N, the number of said pulses received;

(c) range memory means having N pulse count memory location and connected to receive the pulse counts from the range counting means for storing in each of M different pulse count memory locations corresponding to the event pulses established by the signal schedule, an event count enabling signal code and for providing, whenever the pulse count by the range counting means reaches one of the M established event pulse, an event count enabling signal;

(d) event counting means connected for receiving from the range memory means the event count enabling signals and, in respone to receiving an event count enabling signal, for indexing one event count, an event count from 1 through M being thereby provided;

(e) event memory means having M event memory locations and connected for receiving the event count from the event counting means, for storing in the event memory locations synchronizing signal codes corresdponding to the synchronizing signal to be provided at each event pulse as established by the signal schedule, and for providing, at each event count, corresponding synchronizing signals; and (f) microprocessor means for deriving the signal schedule and for providing instructions to the range memory means as to which M memory locations of the total number of N memory locations are to be used to store the event count enabling signal codes and for providing instructions to the event memory means as to the synchronization signals to be provided at each event count.

20. The signal synchronization apparatus as claimed in claim 19 including means for resetting the range counting means and the event counting means when the range pulse count reaches the Nth count.

21. The signal synchronization apparatus as claimed in claim 20 wherein the resetting means includes means associated with the event memory means for providing to the range counting means and the event counting means an end-of-range signal when the Nth pulse count is reached.

* * * * *